United States Patent
Farnsworth

(10) Patent No.: US 8,020,430 B2
(45) Date of Patent: Sep. 20, 2011

(54) PASSIVE LEAK DETECTION DEVICES AND SYSTEMS FOR DETECTING GAS LEAKS

(75) Inventor: Jared Michael Farnsworth, Sacramento, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 544 days.

(21) Appl. No.: 12/248,240

(22) Filed: Oct. 9, 2008

(65) Prior Publication Data

US 2010/0089127 A1 Apr. 15, 2010

(51) Int. Cl.
*G01M 3/04* (2006.01)

(52) U.S. Cl. .................................. 73/40.5 R

(58) Field of Classification Search ............... 73/40.5 R; 340/438

See application file for complete search history.

(56) References Cited

U.S. PATENT DOCUMENTS

| | | | |
|---|---|---|---|
| 4,253,428 A | | 3/1981 | Billings et al. |
| 5,014,543 A | * | 5/1991 | Franklin et al. ............ 73/40.5 R |
| 5,046,519 A | * | 9/1991 | Stenstrom et al. ................. 137/1 |
| 5,170,124 A | | 12/1992 | Blair et al. |
| 5,359,968 A | | 11/1994 | Shiraishi et al. |
| 5,501,200 A | | 3/1996 | Bogartz |
| 6,800,389 B2 | * | 10/2004 | Hirakata ........................ 429/434 |
| 6,815,107 B2 | | 11/2004 | Inai et al. |
| 6,851,298 B2 | * | 2/2005 | Miura et al. ............... 73/40.5 R |
| 6,884,532 B2 | | 4/2005 | Monzel |
| 7,127,937 B1 | * | 10/2006 | Thyroff ...................... 73/40.5 R |
| 7,240,641 B2 | | 7/2007 | Balan |
| 7,581,431 B2 | * | 9/2009 | Yoshida ...................... 73/40.5 R |
| 7,629,067 B2 | * | 12/2009 | Beliveau et al. .............. 429/411 |
| 7,648,787 B2 | * | 1/2010 | Suematsu et al. ............. 429/432 |
| 7,882,728 B2 | * | 2/2011 | Kizaki et al. ............... 73/40.5 R |
| 7,942,035 B2 | * | 5/2011 | Booden et al. ............. 73/40.5 R |
| 2007/0193340 A1 | | 8/2007 | Yoshida |
| 2008/0141760 A1 | * | 6/2008 | Sienkowski et al. ....... 73/40.5 R |

* cited by examiner

*Primary Examiner* — John Fitzgerald
(74) *Attorney, Agent, or Firm* — Dinsmore & Shohl LLP

(57) ABSTRACT

A passive leak detection device may include a pressure switch, a check valve and a balance valve. The pressure switch may include an electric input lead, an electric output lead, a balance chamber and an inlet chamber. A pressure differential between the balance chamber and the inlet chamber may be operable to couple the electric input lead to the electric output lead. The inlet chamber may be fluidly coupled to a fluid port. The balance chamber may be fluidly coupled to the fluid port with a check valve disposed there between. The balance chamber may be fluidly coupled to a balance valve. When the balance valve is closed and fluid is flowing out of the fluid port, the pressure differential from the inlet chamber to the balance chamber is operable to couple the electric output lead to the electric input lead thereby indicating of a leak.

20 Claims, 3 Drawing Sheets

PASSIVE LEAK DETECTION DEVICES AND SYSTEMS FOR DETECTING GAS LEAKS

TECHNICAL FIELD

The present invention generally relates to devices and systems for detecting gas leaks and, more specifically, to passive hydrogen leak detection devices and leak detection systems for use in conjunction with pressurized gas systems.

BACKGROUND

A common method for passively detecting gas leaks in systems utilizing a pressurized gas is to include an odorant in the gas such that, if gas leaks from the system, the odor of the gas in the area surrounding the system will alert individuals in the vicinity of the system that a gas leak is occurred. An example of this is the odorant added to natural gas. However, a gas odorant cannot be used in conjunction with systems utilizing pressurized hydrogen gas, such as hydrogen fuel cell vehicles, due to the small size of $H^2$ gas molecules relative to the odorant molecules. More specifically, a leak in the system may allow the hydrogen gas to escape but not the odorant. Under such conditions, a hydrogen gas leak from the system may go undetected.

Many systems which utilize pressurized hydrogen gas utilize active detection systems in order to detect the presence of a hydrogen gas leak. For example, hydrogen fuel cell vehicles may contain a variety of redundant systems for actively detecting a hydrogen gas leak from the system. These redundant systems may include pressure sensors to detect a pressure drop in the hydrogen gas storage tank and/or fuel lines connected to the hydrogen gas storage tank; flow rate meters to monitor the flow of hydrogen gas from the tank; and/or combustible gas sensors for detecting the presence of hydrogen gas outside of the storage tank and/or fuel lines. However, all of these various active detection systems require power from the hydrogen fuel cell vehicle to operate and as such, when the vehicle is switched off, the active detection systems deplete the battery system of the vehicle. Accordingly, the active detection systems may not work when the vehicle is off and may not be able to provide an operator of the vehicle with an indication that a hydrogen leak has occurred prior to the operator entering the vehicle and powering on the vehicle.

Accordingly, a need exists for alternative devices for detecting hydrogen gas leaks for use in conjunction with systems utilizing pressurized hydrogen gas.

SUMMARY

In one embodiment, a passive leak detection device may include a pressure switch, a check valve and a balance valve. The pressure switch may include an electric input lead, an electric output lead, a balance chamber and an inlet chamber. A pressure differential between the balance chamber and the inlet chamber may be operable to close the pressure switch and may be further operable to electrically couple the electric input lead to the electric output lead. The inlet chamber may be fluidly coupled to a fluid port. The balance chamber may be fluidly coupled to the fluid port with a check valve disposed between the balance chamber and the fluid port such that fluid flowing from the fluid port to the balance chamber passes through the check valve. The check valve may be oriented to prevent fluid flow from the balance chamber to the fluid port. The balance chamber may be fluidly coupled to a balance valve. When the balance valve is open, the pressure differential between the inlet chamber and the balance chamber is zero and the electric input lead is not electrically coupled to the electric output lead. When the balance valve is closed and fluid is flowing into the fluid port, the pressure differential between the inlet chamber and the balance chamber is zero and the electric input lead is not electrically coupled to the electric output lead. When the balance valve is closed and fluid is flowing out of the fluid port, the pressure differential from the inlet chamber to the balance chamber is positive and the electric input lead is electrically coupled to the electric output lead thereby providing an electrical signal indicative of a leak.

In another embodiment, a system for detecting gas leaks from a pressurized fluid system may include a passive leak detection device, an active leak sensor and a voltage source. The passive leak detection device may include an electrical output lead, an electrical input lead and a fluid port for fluidly coupling the passive leak detection device to the pressurized fluid system, wherein the passive leak detection device may be operable to detect a leak in the pressurized fluid system without the application of electrical power. The voltage source may be electrically coupled to the electric input lead of the passive leak detection device. The active leak sensor may be electrically coupled to the electric output lead of the passive leak detection device, wherein, when the passive leak detection device detects a leak, the electric input lead may be electrically coupled to the electric output lead thereby activating the active leak sensor.

In yet another embodiment, a hydrogen fuel cell vehicle may include a hydrogen gas storage tank and a passive leak detection device. The hydrogen gas storage tank may generally define an interior volume. The passive leak detection device may generally include a pressure switch, a fluid port, a check valve and a balance valve. The pressure switch includes an electric input lead, an electric output lead, a balance chamber and an inlet chamber, wherein a pressure differential between the balance chamber and the inlet chamber may be operable to close the pressure switch and may be further operable to electrically couple the electric input lead to the electric output lead. The inlet chamber may be fluidly coupled to the fluid port. The balance chamber may be fluidly coupled to the fluid port with a check valve disposed between the balance chamber and the fluid port such that fluid flowing from the fluid port to the balance chamber passes through the check valve, wherein the check valve is oriented to prevent fluid flow from the balance chamber to the fluid port. The balance chamber may be fluidly coupled to the balance valve. The fluid port of the passive leak detection device may be fluidly coupled to the interior volume of the hydrogen gas storage tank. When the balance valve is open, the pressure differential between the inlet chamber and the balance chamber is zero and the electrical input lead is not electrically coupled to the electrical output lead. When the balance valve is closed and fluid is flowing into the fluid port from the interior volume of the hydrogen gas storage tank, the pressure differential between the inlet chamber and the balance chamber is zero and the electrical input lead is not electrically coupled to the electrical output lead. When the balance valve is closed and fluid is flowing out of the fluid port and into the interior volume of the hydrogen gas storage tank, the pressure differential from the inlet chamber to the balance chamber is positive and the electrical input lead is electrically coupled to the electrical output lead thereby providing an electrical signal indicative of a leak.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
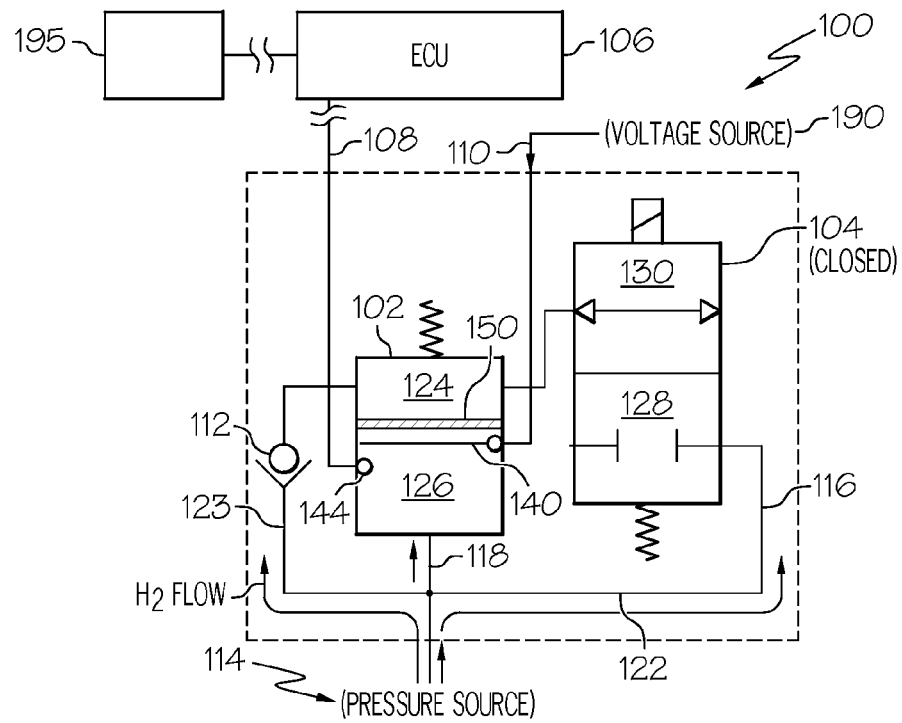
FIG. 1 is a schematic illustration of a passive leak detection device according to one or more embodiments shown and described herein.

FIG. 1 generally depicts a passive leak detection device according to one or more embodiments shown and described herein. The passive leak detection device may generally comprise a pressure switch, a check valve and a balancing valve. The passive leak detection device may be used in conjunction with a pressurized gas system to detect gas leaking from the system. In one particular embodiment, the passive leak detection device may be used in conjunction with a hydrogen gas storage tank of a hydrogen fuel cell vehicle to detect hydrogen gas leaks from the storage tank. The various components of the passive leak detection device, the operation of the passive leak detection device and usage of the passive leak detection device in conjunction with a compressed gas storage tank will be discussed in more detail herein.

Referring now to FIGS. 1 and 2-4, a passive leak detection device 100 is shown according to one embodiment described herein. The passive leak detection device 100 comprises a pressure switch 102, a check valve 112 and a balance valve 104. In the embodiment shown in FIG. 1, the pressure switch 100 is a pressure differential switch which closes an internal electrical relay when a pressure differential develops across the switch. In this embodiment, the pressure switch 102 generally comprises a balance chamber 124 and an inlet chamber 126. A diaphragm 150 or similar flexible barrier may be disposed between the balance chamber 124 and the inlet chamber 126. The pressure switch 102 may also comprise a cantilevered contact 140 and a fixed contact 144. The diaphragm 150 may be deformed when a pressure differential is present between the balance chamber 124 and the inlet chamber 126. More specifically, when the balance chamber 124 is at a greater pressure than the inlet chamber 126, the diaphragm 150 may be deformed towards the cantilevered contact 140, contacting the cantilevered contact 140 and deflecting the cantilevered contact 140 onto the fixed contact 144 thereby completing an electrical circuit (e.g., closing the pressure switch 102) between the cantilevered contact 140 and the fixed contact 144. The pressure switch 102 is depicted in the "open" position in FIGS. 1, 2 and 4 and in the "closed" position in FIG. 3. Accordingly, it should be understood that the pressure switch 102 of the passive leak detection device 100 may be opened and closed based on a pressure differential between the inlet chamber 126 and the balance chamber 124.

When the pressure switch 102 is a pressure differential switch as depicted in FIG. 1, the magnitude of the pressure differential between the balance chamber 124 and the inlet chamber 126 necessary to close the pressure switch 102 may be adjustable. Further, because the pressure differential switch operates based on the difference in pressure between the balance chamber and the inlet chamber, no electric power is needed to open or close the switch. Accordingly, the pressure switch 102 is "passive."

While the pressure switch 102 has been described herein as a pressure differential switch comprising a cantilevered contact 140 and a fixed contact 144, it should be understood that various other configurations of passive differential pressure switches may be used to facilitate operation of the passive leak detection device described herein. Accordingly, unless otherwise specified herein, no particular limitation is intended as to the mechanism by which the pressure differential switch is "opened" or "closed" based on the pressure change between the chambers of the switch.

The inlet chamber 126 of the pressure switch 102 may be fluidly coupled to a pressure source 114 via fluid port 118. The balance chamber 124 may also be fluidly coupled to the fluid port 118 and, in turn, the pressure source 114 via tubing 123 with the check valve 112 disposed along the tubing 123 between the fluid port and the balance chamber 124 such that fluid (e.g., compressed gas) flowing from the pressure source 114 to the balance chamber 124 passes through the check valve 112. The check valve 112 also prevents fluid from exiting the balance chamber 124 through the tubing 123.

The check valve 112 may comprise a ball check valve, a diaphragm check valve, a swing check valve, a lift check valve or a similar type of check valve operable to prevent the flow of fluid from the balance chamber 124 to the pressure source. In the embodiments shown herein, the check valve 112 is a ball check valve.

Figure 4:
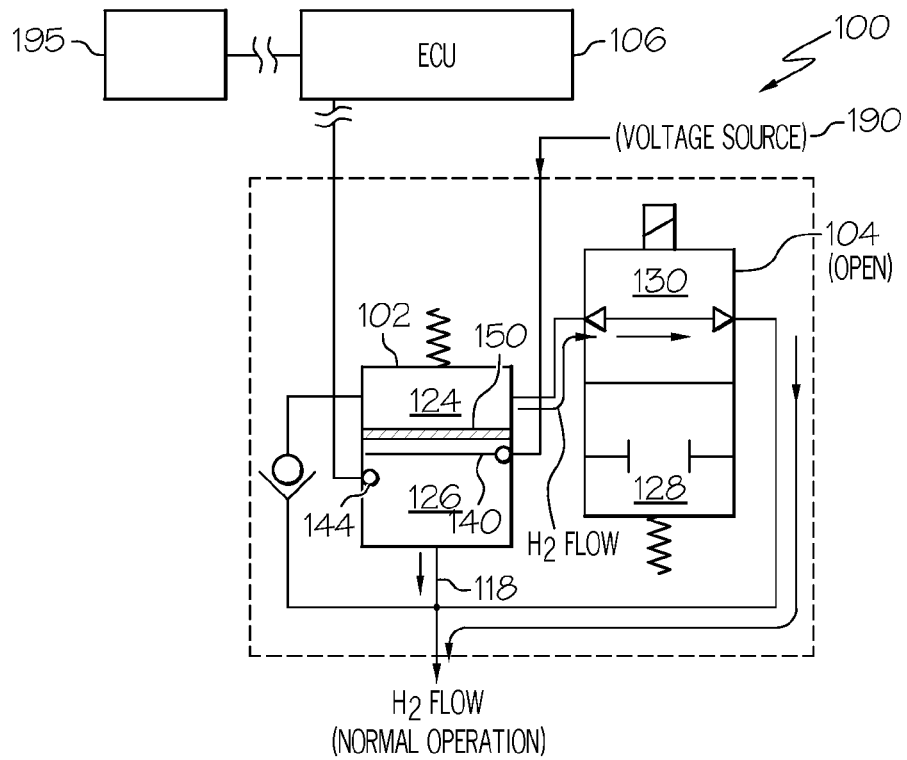
FIG. 4 is a schematic illustration of the passive leak detection device of FIG. 1 during normal operation.

The balance chamber 124 may also be fluidly coupled to the fluid port 118 and, in turn, the pressure source 114 via tubing 122 with a balance valve 104 disposed along the tubing 122 between the fluid port 118 and the balance chamber 124 such that fluid (e.g., compressed gas) flowing between the balance chamber 124 and the pressure source 114 flows through the tubing 122. In the embodiment of the passive leak detection device 100 shown herein, the balance valve 104 is contained within the passive leak detection device 100 and may be a two-way valve which may be closed thereby preventing fluid flow between the balance chamber 124 and the fluid inlet 118. The balance valve 104 may comprise a mechanical valve, an electro-mechanical valve, a solenoid valve, a pneumatically actuated valve, or a hydraulically actuated valve. In the embodiments shown herein, the balance valve 104 may comprise a solenoid valve comprising a first port 130 and a second port 128. The balance valve 104 may be configured such that, when the balance valve is closed, as schematically depicted in FIG. 1, the first port 128 may be fluidly coupled to the pressure source while the second port 130 is fluidly coupled to the balance chamber 124. Accordingly, when the balance valve 104 is closed, the pressure source and the balance chamber are not fluidly coupled through the balance valve and fluid is prevented from flowing in to or out of the balance chamber 124 via the balance valve 104. However when the balance valve 104 is open (as schematically shown in FIG. 4), both the pressure source 114 and the balance chamber 124 are fluidly coupled to the second port 130 such that fluid (e.g., compressed gas) may flow between the balance chamber 124 and the pressure source 114.

As will be discussed in more detail herein, the passive leak detection device 100 may be used in conjunction with the hydrogen storage tank of a hydrogen fuel cell vehicle. When the passive leak detection device is employed in such an application and the balance valve 104 is an electrically actuated valve such as a solenoid valve or an electromechanical valve, the balance valve 104 may be electrically coupled to the ignition system of the vehicle such that, when the vehicle is powered on and hydrogen fuel is flowing out of the hydrogen gas storage tank of the vehicle, the balance valve 104 is open thereby facilitating the equalization of pressure between the balance chamber 124 and the inlet chamber 126, as will be discussed in more detail herein.

Figure 2:
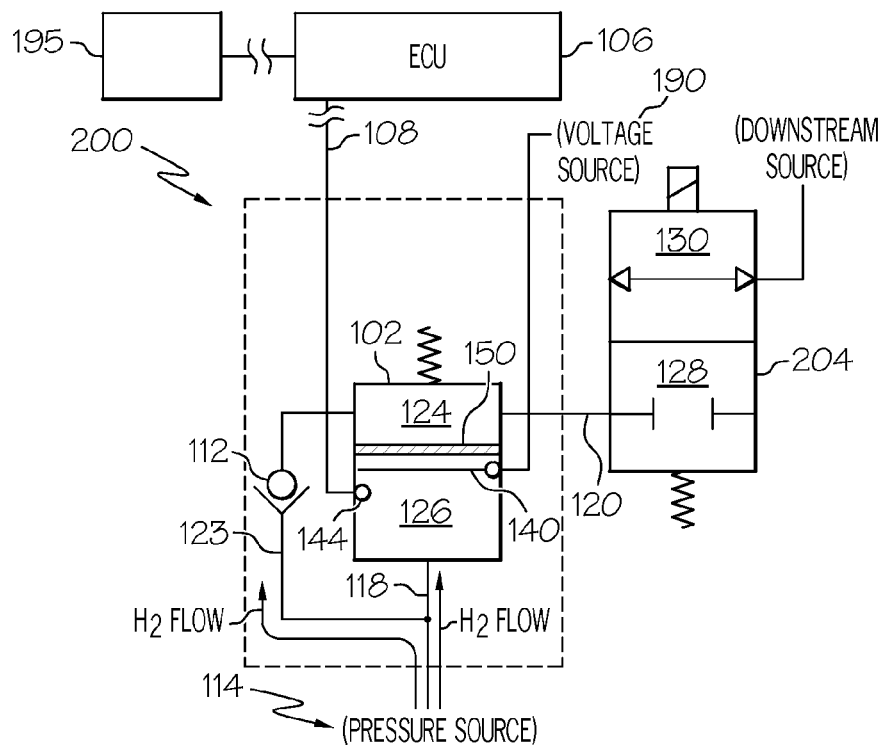
FIG. 2 is a schematic illustration of a passive leak detection device according another embodiment shown and described herein.

Referring now to FIG. 2, another embodiment of a passive leak detection device 200 is shown. In this embodiment, the passive leak detection device 200 comprises a pressure switch 102 and a check valve 112 as described above with respect to FIG. 1. The check valve 112 and the pressure switch 102 may be fluidly coupled to each other and the pressure source 114 as described above with respect to FIG. 1. However, in this embodiment, the passive leak detection device 200 may be fluidly coupled to an external balance valve 204 with tubing 120. As used herein "external" refers to the external balance valve 204 being external to the passive leak detection device 200. The external balance valve 204 may be used to control the flow of fluid out of the balance chamber 124 of the pressure switch 102 and thereby the equalization of pressure between the balance chamber 124 and the inlet chamber 126. The external balance valve 204 may be a two-way valve fluidly coupling the balance chamber 124 to a downstream (e.g., low) pressure source. The external balance valve 204 may be opened, thereby permitting fluid to flow from the balance chamber to the downstream pressure source, or closed, thereby preventing fluid flow from the balance chamber 124. The external balance valve 204 may comprise a mechanical valve, an electromechanical valve, a solenoid valve, a pneumatically actuated valve, or a hydraulically actuated valve. In the embodiments shown herein, the external balance valve 204 may comprise a solenoid valve comprising a first port 130 and a second port 128. The balance chamber is fluidly coupled to the second port 128 while the downstream pressure source is fluidly coupled to the first port 130. When the solenoid valve is closed, fluid (e.g., compressed gas) may be prevented from flowing from the balance chamber 124 and the downstream pressure source. However, when the solenoid valve is open, fluid may flow from the balance chamber 124 to the downstream pressure source.

In one embodiment, when the passive leak detection device 200 is used in conjunction with a hydrogen gas storage tank, such as a hydrogen gas storage tank of a hydrogen fuel cell vehicle, the external balance valve 204 may be the solenoid inlet/outlet valve of the hydrogen storage tank. In this embodiment, the pressure source 114 may be the pressure in the hydrogen storage tank and both the pressure source 114 and the pressure balance chamber 124 may be fluidly coupled to the first port 128 of the solenoid inlet/outlet valve while the second port 130 of the solenoid inlet/outlet valve may be fluidly coupled to a line outside the hydrogen gas storage tank. This embodiment will be discussed in more detail herein with specific reference to FIG. 7.

Referring now to FIGS. 1-4, the passive leak detection device 100, 200 may also be electrically coupled to a voltage source 190 and an electronic control unit (ECU) 106. More specifically, the pressure switch 102 may comprise an electric output lead 108 and an electric input lead 110. The cantilevered contact 140 of the pressure switch 102 may be electrically coupled to the voltage source 190 with the electric input lead 110 while the fixed contact 144 is electrically coupled to the ECU 106 with electric output lead 108 such that, when the pressure switch is closed (e.g., when the cantilevered contact 140 is in electrical contact with the fixed contact 144), the electric input lead 110 is electrically coupled to the electrical output lead 108 and an electrical signal is passed from the voltage source 190 to the ECU 106 through the pressure switch 102. In one embodiment (discussed further herein), the electrical signal passed from the voltage source 190 to the ECU 106 through the pressure switch 102 switches on the ECU 106.

The ECU 106 may be electrically coupled to one or more active (e.g., powered) leak sensors 195 (e.g., pressure sensors, flow meters, combustible gas sensors, hydrogen gas sensors or similar leak sensors or devices as will be apparent to one skilled in the art) operable to detect a gas leak. The ECU 106 may be programmed to switch on the active leak sensor 195 when the ECU 106 is switched on by an electrical signal received from the passive leak detection device 100. For example, when the passive leak detection device 100, 200 is used in conjunction with a hydrogen storage tank in a hydrogen fuel cell vehicle, the ECU 106 may be electrically coupled to a hydrogen gas sensor. When the ECU 106 is switched on by the pressure switch 102, the ECU 106 may be programmed to, in turn, activate the hydrogen gas sensor.

In another embodiment (not shown), the passive leak detection devices 100, 200 may be electrically coupled to a voltage source 190, as described above. The passive leak detection device 100 may also be directly coupled to one or more active (e.g., powered) leak sensors (e.g., pressure sensors, flow meters, combustible gas sensors, hydrogen gas sensors or similar leak sensors or devices as will be apparent to one skilled in the art) via the electric output lead 108. The active leak detection sensor(s) 195 may be operable to detect a gas leak. When the pressure switch 102 is closed, the electric output lead 108 is electrically coupled to the electric input lead 110 thereby powering the active leak sensor 195 via the electrical lead 108 and activating the active leak detection sensor 195. For example, when the passive leak detection device 100 is used in conjunction with a hydrogen gas storage tank in a hydrogen fuel cell vehicle, the passive leak detection device 100 may be electrically coupled to a hydrogen gas sensor via the electric output lead 108. When the pressure switch 102 is closed the hydrogen gas sensor is activated.

In another embodiment (not shown), the passive leak detection devices 100, 200 may be electrically coupled to a voltage source 190, as described above. The passive leak detection device 100 may also be directly coupled to one or more warning indicators, such as a visual warning indicator and/or an audible warning indicator, via the electric output lead 108. When the pressure switch 102 is closed, the electric output lead 108 is electrically coupled to the electric input lead 110 and an electrical signal is provided to the warning indicator which produces a visual and/or an audible indication of the presence of a gas leak.

Accordingly, it should now be understood that the passive leak detection devices described herein may be used in conjunction with one or more active leak sensor(s) and/or an electronic control unit in a leak detection system. The passive leak detection device 100, 200 may be used to passively (e.g., no electrical power is required) detect leaks and, when a leak is detected, the passive leak detection device 100, 200 switches on an active leak sensor(s), either directly or via an electronic control unit, to actively detect and verify the presence of a leak. In certain applications, such as when the leak detection system is used in conjunction with a hydrogen gas storage tank of a hydrogen fuel cell vehicle, the use of the passive leak detection device 100, 200 to passively detect the presence of leaks minimizes power consumption when the vehicle is switch off.

Figure 5:
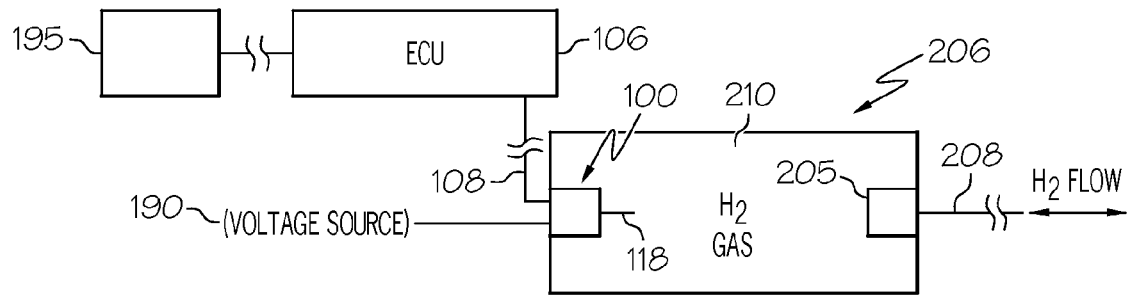
FIG. 5 is a schematic illustration of the passive leak detection device of FIG. 1 positioned in a hydrogen gas storage tank according to one embodiment shown and described herein.
Figure 6:
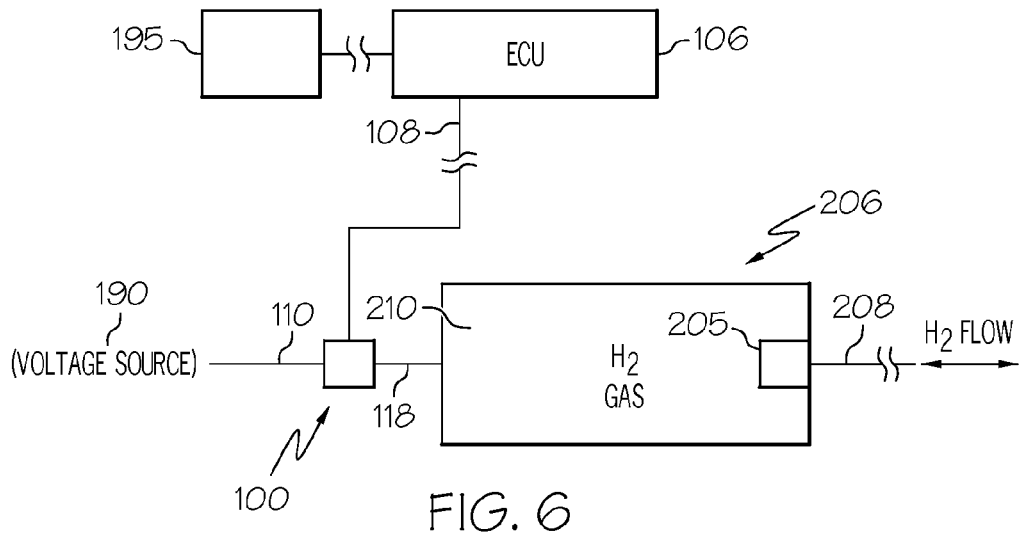
FIG. 6 is a schematic illustration of the passive leak detection device of FIG. 1 fluidly connected to a hydrogen gas storage tank according to one embodiment shown and described herein.
Figure 7:
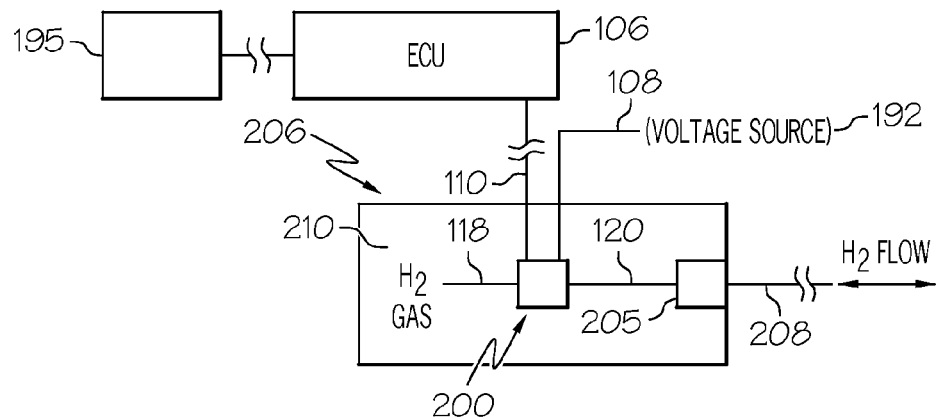
FIG. 7 is a schematic illustration of the passive leak detection device of FIG. 2 positioned in a hydrogen gas storage tank according to one embodiment shown and described herein.

Referring to FIGS. 5-7, the passive leak detection devices 100, 200 shown and described herein may be used in conjunction with a hydrogen gas storage tank 206, such as a hydrogen gas storage tank of a hydrogen fuel cell vehicle, to detect hydrogen gas leaking from the hydrogen gas storage tank 206. The hydrogen gas storage tank 206 may generally enclose an interior volume 210. The hydrogen gas storage tank 206 may comprise an inlet/outlet valve 205 for controlling the flow of hydrogen gas from the tank, such as when the hydrogen fuel cell vehicle is operating and hydrogen gas is flowing to the fuel cell, and for controlling the flow of hydrogen gas into the storage tank, such as when the hydrogen gas storage tank 206 is being filled. The inlet/outlet valve 205 may comprise a solenoid valve, such as the solenoid valves shown in FIGS. 1-4. The solenoid valve 205 may be fluidly coupled to piping or tubing 208 which facilitates coupling the hydrogen gas storage tank to other piping and/or components.

While FIGS. 5-7 depict the inlet/outlet valve 205 as being disposed within the volume 210 of the hydrogen gas storage tank 206, it should be understood that the inlet/outlet valve 205 may also be positioned on the exterior of the hydrogen gas storage tank 206. Moreover, while the inlet/outlet valve 205 has been described herein as a solenoid valve, it should be understood that the inlet/outlet valve 205 may comprise any suitable 2-way valve including a mechanical valve, an electromechanical valve, a hydraulically actuated valve or a pneumatically actuated valve.

As shown in FIG. 5, in one embodiment, the passive leak detection device 100 may be positioned in the interior volume 210 of the hydrogen gas storage tank 206 and operatively attached to an interior wall of the hydrogen gas storage tank 206. The fluid port 118 extends outward from the passive leak detection device 100 and in to the interior volume 210 of the hydrogen gas storage tank 206 thereby fluidly coupling the passive leak detection device 100 to the interior volume 210 of the hydrogen gas storage tank 206. The electric output lead 108 and the electric input lead 110 may extend outside the hydrogen gas storage tank 206 and electrically couple the passive leak detection device 100 with the voltage source 195 and the ECU 106 and/or the active leak sensor 195.

As shown in FIG. 6, in another embodiment, the passive leak detection device 100 may be positioned on an exterior portion of the hydrogen gas storage tank 206. In this embodiment, the fluid port 118 is fluidly coupled to the interior volume 210 thereby fluidly coupling the passive leak detection device 100 to the hydrogen gas storage tank 206. As discussed above with respect to FIG. 1, the passive leak detection device 100 may be electrically coupled to a voltage source 190 and an ECU 106 and/or an active leak sensor 195.

As shown in FIG. 7, in yet another embodiment, the passive leak detection device 200 shown in FIG. 2 may be positioned in the interior volume 210 of the hydrogen gas storage tank 206 and operatively attached to an interior wall of the hydrogen gas storage tank 206 as shown in FIG. 5. The fluid port 118 extends into the interior volume 210 of the hydrogen gas storage tank such that the passive leak detection device 200 is fluidly coupled to the interior volume of the hydrogen gas storage tank 206. However, in this embodiment, the passive leak detection device 200 is also fluidly coupled to the inlet/outlet valve 205 of the hydrogen gas storage tank 206 via tubing 120 (e.g., the external balance valve 204 is the inlet/outlet valve 205 of the hydrogen gas storage tank 206). More specifically, the balance chamber 124 of the pressure switch 102 of the passive leak detection device 200 is fluidly coupled to the inlet/outlet valve 205 such that, when the inlet/outlet valve is open, pressure across the pressure switch 102 is equalized. The electric output lead 108 and the electric input lead 110 may extend outside the hydrogen gas storage tank 206 and electrically couple the passive leak detection device 100 with the voltage source 195 and the ECU 106 and/or the active leak sensor 195.

While FIGS. 5 and 6 show the passive leak detection device 100 positioned inside the volume of a hydrogen gas storage tank 206, it should be understood that the passive leak detection device 100 may be operatively attached to the piping of a pressurized fluid system. For example, in one embodiment (not shown) the passive leak detection device 100 may be, in the alternative, attached to the tubing 208 outside the hydrogen gas storage tank 206. More specifically, the fluid port 118 of the passive leak detection device 100 may be fluidly coupled to the tubing 208 such that the passive leak detection device 100 is fluidly coupled to the tubing 208.

The operation of the passive leak detection device 100 in conjunction with a hydrogen gas storage tank 206, such as a hydrogen gas storage tank of a hydrogen fuel cell vehicle, will now be described in more detail with specific reference to the passive leak detection devices 100-200 in FIGS. 1 and 3-4 and the hydrogen gas storage tank depicted in FIG. 5. The passive leak detection device 100 has three basic modes of operation: fueling mode, normal mode and leak mode. Each mode of operation will be described in more detail herein.

FIG. 1 shows the status of the passive leak detection device when the hydrogen gas storage tank 206 is being filled with fuel (e.g., pressurized hydrogen gas is being pumped into the hydrogen gas storage tank). The hydrogen gas in the hydrogen gas storage tank 206 acts as the pressure source 114. As depicted in FIG. 1, the balance valve 104 may be closed during fueling. However, it should be understood that the balance valve 104 may also be open during fueling thereby achieving the same effect. As hydrogen gas is pumped into the hydrogen gas storage tank 206, the hydrogen gas flows into the passive leak detection device 100 through the fluid port 118 and enters the inlet chamber 126 of the pressure switch 102. The hydrogen gas also flows from the fluid port 118 through the tubing 123 and the check valve 112 and into the balance chamber 124 such that the pressure in the balance chamber 124 is the same as the pressure in the inlet chamber 126. Further, when the balance valve 104 is open, fluid may also flow from the fluid port 118 through the tubing 122 and the balance valve 104 and into the balance chamber such that the pressure is the same in the balance chamber 124 and the inlet chamber 126. Accordingly, because the pressure between the balance chamber 124 and the inlet chamber 126 is balanced, the pressure switch 102 is open and the electric output lead 108 is not electrically coupled to the electric input lead 110. As such, an electrical signal is not sent from the pressure switch to the ECU 106 and/or the active leak sensor 195. More specifically, because the pressure in the balance chamber 124 is not greater than the inlet chamber 124, the diaphragm 150 is not deformed towards the cantilevered contact 140 and the circuit between the cantilevered contact 140 and the fixed contact 144 remains open. As such, neither the ECU 106 nor the active leak sensor 195 are triggered. It should also be understood that, under steady-state conditions (e.g., the vehicle is off and there is no gas or fluid flow into or out of the inlet port 118 of the passive leak detection device) the pressure switch 102 of the passive leak detection device remains open and no power is provided to either the ECU 106 or the active leak sensor 195 thereby reducing the power consumption of the vehicle when the vehicle is switched off.

Figure 3:
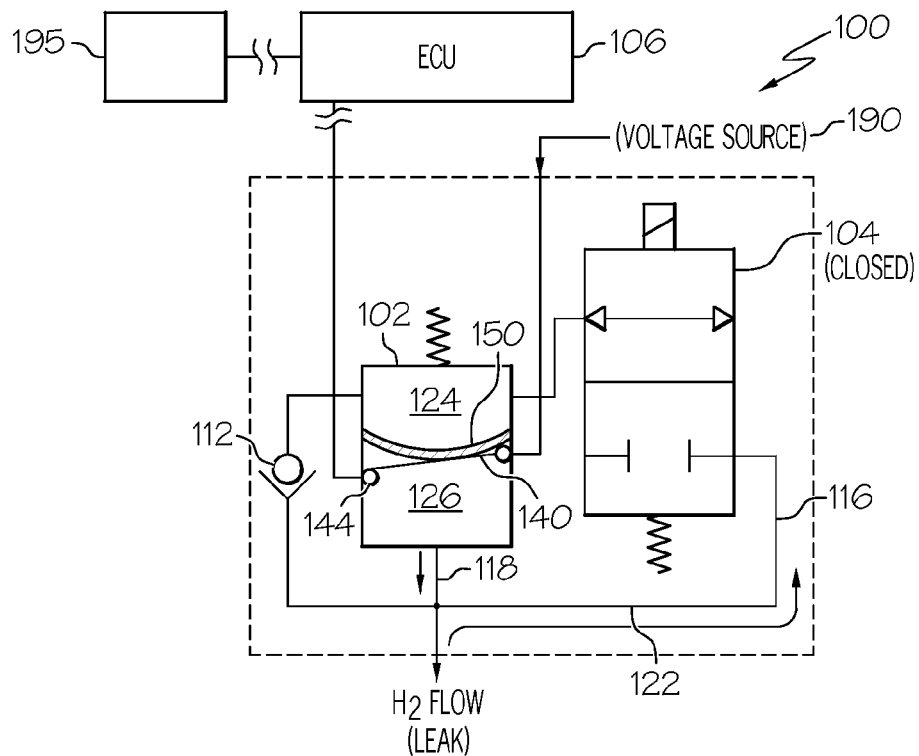
FIG. 3 is a schematic illustration of the passive leak detection device of FIG. 1 during a hydrogen gas leak.

FIG. 3 shows the status of the passive leak detection device when hydrogen gas is leaking from the hydrogen gas storage tank 206. This condition assumes that the vehicle in which the hydrogen gas storage tank is employed is switched off. When the vehicle is switched off, the balance valve 104 is closed and, as such, hydrogen gas in the balance chamber 124 cannot escape from the balance chamber 124 through the balance valve 104. Similarly, hydrogen gas in the balance chamber 124 cannot escape from the balance chamber 124 through the check valve 112. Accordingly, the gas pressure in the balance chamber 124 remains constant. However, as hydrogen gas leaks from the hydrogen gas storage tank 206, hydrogen gas exits the inlet chamber 126 via the fluid port 118. As such, the pressure in the inlet chamber 126 decreases creating a pressure differential between the balance chamber 124 and the inlet chamber 126, specifically a positive pressure differential from the inlet chamber 126 to the balance chamber 124. Because of the pressure differential from the inlet chamber 126 to the balance chamber 124, the diaphragm 150 deforms toward the cantilevered contact 140 thereby closing the circuit between the cantilevered contact 140 and the fixed contact 144 and electrically coupling the electric output lead 108 to the electrical input lead 110 (e.g., the pressure switch 102 is closed). When the pressure switch 102 is closed, the passive leak detection device 100 outputs an electrical signal from the electric output lead 108 indicative of a leak. The electrical signal indicative of the leak is transmitted to the ECU 106 and/or the active leak detection sensor 195 via the electric output lead 108 thereby powering on the active leak sensor 195 to confirm if hydrogen gas is indeed leaking from the hydrogen gas storage tank. If the active leak sensor 195 determines that hydrogen gas is leaking from the tank, the leak detection sensor may be operable to provide a visual and/or audible signal to an operator of the vehicle of the presence of the leak. If no leak is present, the balance valve 104 may open to equalize the pressure between the balance chamber 124 and the inlet chamber 126.

FIG. 4 shows the passive leak detection device 100 during normal operation of the hydrogen fuel cell vehicle. As discussed hereinabove, the balance valve 104 of the passive leak detection device 100 may be electrically coupled to the ignition of the vehicle such that, when the vehicle is switched on and hydrogen is flowing out of the hydrogen gas storage tank 206, the balance valve 104 is open. Further, as hydrogen gas flows out of the hydrogen gas storage tank, hydrogen gas also flows out of the inlet chamber 126 of the pressure switch 102 and out of the passive leak detection device through the fluid port 118 thereby reducing the pressure in the inlet chamber 126. Similarly, hydrogen gas also flows out of the balance chamber 124 through the open balance valve 104 and out of the passive leak detection device 100 through the fluid port 118 thereby reducing the pressure in the balance chamber 124 by an amount equal to the reduction in pressure in the inlet chamber 126. Accordingly, the pressure differential between the inlet chamber 126 and the outlet chamber 124 remains zero and, as such, the diaphragm 150 is not deformed and the electrical connection between the cantilevered contact 140 and the fixed contact 144 remains open and the electric output lead 108 is not electrically coupled to the electric input lead 110 (e.g., the pressure switch 102 is open). As such, neither the ECU 106 nor the active leak sensor 195 are triggered.

It should be understood that the embodiment of the passive leak detection device 200 works in substantially the same manner as the passive leak detection device 100 depicted in FIGS. 1 and 3-4 with the external balance valve 204 taking the place of the balance valve 104. However, when the external balance valve 204 is open, such as when the vehicle is switched on and hydrogen gas is flowing from the hydrogen gas storage tank 206, hydrogen gas in the balance chamber 124 flows out of the balance chamber 124 and the passive leak detection device 200 through the external balance valve 204 to the downstream pressure source instead of out of the fluid port 118 thereby equalizing the pressure between the balance chamber 124 and the inlet chamber 126.

While specific embodiments shown and described herein discuss the passive leak detection devices 100, 200 being used in conjunction with a hydrogen storage tank and, specifically, a hydrogen storage tank of a hydrogen fuel cell vehicle, is should be understood that the passive leak detection devices may be readily adapted for use with hydrogen storage tanks employed in other applications such as tanks used to store hydrogen and hydrogen vehicle fueling stations and the like. Moreover, the passive leak detection devices 100, 200 described herein may also be readily adapted to other pressurized gas and/or fluid systems utilizing gases or fluids other than hydrogen.

It should now be understood that the passive leak detection devices shown and described herein may be used to passively detect gas leaks from a system utilizing pressurized gas. Because the passive leak detection devices are passive and do not consume any power prior to detecting the leak, the passive leak detection devices are particularly well suited for use in conjunction with applications where power consumption is a concern, such as in hydrogen fuel cell vehicles. More specifically, the passive leak detection device may be used to detect hydrogen gas leaks from the hydrogen storage tank and/or the hydrogen gas supply lines of hydrogen fuel cell vehicles. However, it should also be understood that the passive leak detection devices shown and described herein may also be used with other compressed or pressurized gas systems which employ gases other than hydrogen.

Further, the passive leak detection devices may also be used in conjunction with active leak sensors to form a leak detection system. The presence of a leak may be initially detected by the passive leak sensor without the application of electrical power. When a leak is detected, the passive leak sensor may power on the active leak sensor to verify the presence of a leak. A redundant passive leak detection device of this configuration may reduce the electrical power consumed in systems for detecting leaks in pressurized systems.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A passive leak detection device comprising a pressure switch, a check valve and a balance valve wherein:

the pressure switch comprises an electric input lead, an electric output lead, a balance chamber and an inlet chamber, wherein a pressure differential between the balance chamber and the inlet chamber is operable to close the pressure switch and is further operable to electrically couple the electric input lead to the electric output lead;

the inlet chamber is fluidly coupled to a fluid port;

the balance chamber is fluidly coupled to the fluid port with a check valve disposed between the balance chamber and the fluid port such that fluid flowing from the fluid port to the balance chamber passes through the check valve, wherein the check valve is oriented to prevent fluid flow from the balance chamber to the fluid port; and the balance chamber is fluidly coupled to a balance valve, wherein:

when the balance valve is open, the pressure differential between the inlet chamber and the balance chamber is zero and the electric input lead is not electrically coupled to the electric output lead;

when the balance valve is closed and fluid is flowing into the fluid port, the pressure differential between the inlet chamber and the balance chamber is zero and the electric input lead is not electrically coupled to the electric output lead; and when the balance valve is closed and fluid is flowing out of the fluid port, the pressure differential from the inlet chamber to the balance chamber is positive and the electric input lead is electrically coupled to the electric output lead thereby providing an electrical signal indicative of a leak.

2. The passive leak detection device of claim 1 wherein the balance valve is also fluidly coupled to the fluid port such that, when the balance valve is open, fluid may flow between the fluid port and the balance chamber through the balance valve thereby reducing the pressure differential between the inlet chamber and the balance chamber.

3. The passive leak detection device of claim 1 wherein the balance valve is also fluidly coupled to a downstream pressure source such that, when the balance valve is open, fluid may flow between the balance chamber and the downstream pressure source thereby reducing the pressure differential between the inlet chamber and the balance chamber.

4. The passive leak detection device of claim 1 further comprising a warning indicator electrically coupled to the electric output lead such that, when the electric output lead is electrically coupled to the electric input lead, the warning indicator is activated.

5. The passive leak detection device of claim 1 further comprising an active leak sensor electrically coupled to the electric output lead such that, when the electric output lead is electrically coupled to the electric input lead, the active leak sensor is powered on.

6. The passive leak detection device of claim 1 further comprising an electronic control unit electrically coupled to the electric output lead such that, when the electric output lead is electrically coupled to the electric input lead, the electronic control unit is powered on.

7. The passive leak detection device of claim 6 wherein the electronic control unit is electrically coupled to at least one active leak sensor and the electronic control unit is programmed to activate the active leak sensor when the electronic control unit is powered on.

8. A system for detecting gas leaks from a pressurized fluid system comprising a passive leak detection device, an active leak sensor and a voltage source, wherein:

the passive leak detection device comprises an electrical output lead, an electrical input lead and a fluid port for fluidly coupling the passive leak detection device to the pressurized fluid system, wherein the passive leak detection device is operable to detect a leak in the pressurized fluid system without the application of electrical power;

the voltage source is electrically coupled to the electric input lead of the passive leak detection device; and the active leak sensor is electrically coupled to the electric output lead of the passive leak detection device, wherein, when the passive leak detection device detects a leak, the electric input lead is electrically coupled to the electric output lead thereby activating the active leak sensor.

9. The system for detecting leaks of claim 8 wherein the active leak sensor is electrically coupled to the electric output lead of the passive leak detection device via an electronic control unit, wherein the electronic control unit is programmed to activate the active leak sensor when the passive leak detection device detects a leak.

10. The system for detecting leaks of claim 8 wherein the passive leak detection device further comprises a pressure switch, a check valve and a balance valve, wherein:

the pressure switch comprises a balance chamber and an inlet chamber, wherein a pressure differential between the balance chamber and the inlet chamber is operable to close the pressure switch thereby electrically coupling the electric input lead to the electric output lead;

the inlet chamber is fluidly coupled to the fluid port;

the balance chamber is fluidly coupled to the fluid port with the check valve disposed between the balance chamber and the fluid port such that fluid flowing from the fluid port to the balance chamber passes through the check valve; and the balance chamber is fluidly coupled to the balance valve, wherein:

when the balance valve is open, the pressure differential between the inlet chamber and the balance chamber is zero and the electric input lead is not electrically coupled to the electric output lead;

when the balance valve is closed and fluid is flowing into the fluid port, the pressure differential between the inlet chamber and the balance chamber is zero and the electric input lead is not electrically coupled to the electric output lead; and when the balance valve is closed and fluid is flowing out of the fluid port, the pressure differential from the inlet chamber to the balance chamber is positive and the electric input lead is electrically coupled to the electric output lead thereby providing an electrical signal indicative of a leak.

11. The system for detecting leaks of claim 10 wherein the balance valve is also fluidly coupled to the fluid port such that, when the balance valve is open, fluid may flow between the fluid port and the balance chamber through the balance valve thereby reducing the pressure differential between the inlet chamber and the balance chamber.

12. The system for detecting leaks of claim 10 wherein the balance valve is also fluidly coupled to a downstream pressure source such that, when the balance valve is open, fluid may flow between the balance chamber and the downstream pressure source thereby reducing the pressure differential between the inlet chamber and the balance chamber.

13. A hydrogen fuel cell vehicle comprising a hydrogen gas storage tank and a passive leak detection device, wherein:

the hydrogen gas storage tank generally defines an interior volume;

the passive leak detection device comprises a pressure switch, a fluid port, a check valve and a balance valve wherein:

the pressure switch comprises an electric input lead, an electric output lead, a balance chamber and an inlet chamber, wherein a pressure differential between the balance chamber and the inlet chamber is operable to close the pressure switch and is further operable to electrically couple the electric input lead to the electric output lead;

the inlet chamber is fluidly coupled to the fluid port;

the balance chamber is fluidly coupled to the fluid port with a check valve disposed between the balance chamber and the fluid port such that fluid flowing from the fluid port to the balance chamber passes through the check valve, wherein the check valve is oriented to prevent fluid flow from the balance chamber to the fluid port;

the balance chamber is fluidly coupled to a balance valve;

the fluid port of the passive leak detection device is fluidly coupled to the interior volume of the hydrogen gas storage tank, wherein:

when the balance valve is open, the pressure differential between the inlet chamber and the balance chamber is zero and the electrical input lead is not electrically coupled to the electrical output lead;

when the balance valve is closed and fluid is flowing into the fluid port from the interior volume of the hydrogen gas storage tank, the pressure differential between the inlet chamber and the balance chamber is zero and the electrical input lead is not electrically coupled to the electrical output lead; and when the balance valve is closed and fluid is flowing out of the fluid port and into the interior volume of the hydrogen gas storage tank, the pressure differential from the inlet chamber to the balance chamber is positive and the electrical input lead is electrically coupled to the electrical output lead thereby providing an electrical signal indicative of a leak.

14. The hydrogen fuel cell vehicle of claim 13 wherein the balance valve is also fluidly coupled to the fluid port such that, when the balance valve is open, fluid may flow between the fluid port and the balance chamber through the balance valve thereby reducing the pressure differential between the inlet chamber and the balance chamber.

15. The hydrogen fuel cell vehicle of claim 13 wherein the balance valve is also fluidly coupled to a downstream pressure source such that, when the balance valve is open, fluid may flow between the balance chamber and the downstream pressure source thereby reducing the pressure differential between the inlet chamber and the balance chamber.

16. The hydrogen fuel cell vehicle of claim 13 wherein the balance valve is an inlet/outlet valve of the hydrogen gas storage tank.

17. The hydrogen fuel cell vehicle of claim 13 further comprising a warning indicator electrically coupled to the electric output lead such that, when the electric output lead is electrically coupled to the electric input lead, the warning indicator is activated.

18. The hydrogen fuel cell vehicle of claim 13 further comprising a hydrogen gas sensor electrically coupled to the electric output lead such that, when the electric output lead is electrically coupled to the electric input lead, the hydrogen gas sensor is powered on.

19. The hydrogen fuel cell vehicle of claim 13 further comprising an electronic control unit electrically coupled to the electric output lead such that, when the electric output lead is electrically coupled to the electric input lead, the electronic control unit is powered on.

20. The hydrogen fuel cell vehicle of claim 19 wherein the electronic control unit is electrically coupled to at least one active leak sensor and the electronic control unit is programmed to activate the active leak sensor when the electronic control unit is powered on.

* * * * *